United States Patent [19]
Shigeta et al.

[11] Patent Number: 6,159,326
[45] Date of Patent: Dec. 12, 2000

[54] METHOD OF AND APPARATUS FOR APPLYING LIGHT-SHIELD MEMBER TO PHOTOSENSITIVE MEMBER

[75] Inventors: Bungo Shigeta; Akihisa Inoue; Akinori Takase, all of Minamiashigara, Japan

[73] Assignee: Fuji Photo Film Co., Ltd., Kanagawa-Ken, Japan

[21] Appl. No.: 09/211,048

[22] Filed: Dec. 15, 1998

[30] Foreign Application Priority Data

Dec. 17, 1997 [JP] Japan ................................ 9-348029

[51] Int. Cl.$^7$ ........................... B65H 35/04; B29C 65/00; B32B 31/00
[52] U.S. Cl. ..................... 156/256; 156/157; 156/267; 156/304.3; 206/415; 242/348.4
[58] Field of Search .................... 156/256, 267, 156/157, 304.3; 206/415; 242/348.4

[56] References Cited

U.S. PATENT DOCUMENTS

| | | | |
|---|---|---|---|
| 5,222,601 | 6/1993 | Takahashi et al. | 206/416 |
| 5,368,464 | 11/1994 | Stewart et al. | 425/174.2 |
| 5,462,164 | 10/1995 | Cornelissen et al. | 206/389 |
| 5,855,336 | 1/1999 | Inoue et al. | 242/525.6 |
| 6,022,678 | 2/2000 | Makino | 430/501 |

FOREIGN PATENT DOCUMENTS

| | | | |
|---|---|---|---|
| 54-91676 | 7/1979 | Japan | B65H 25/24 |
| 59-219198 | 12/1984 | Japan | B62D 7/18 |
| 60-488858 | 3/1985 | Japan | B65H 19/18 |
| 1-256459 | 10/1989 | Japan | B65H 21/02 |
| 5-338877 | 12/1993 | Japan | B65H 19/18 |
| 7-266291 | 10/1995 | Japan | B26D 7/18 |
| 9-43781 | 2/1997 | Japan | G03C 3/00 |

*Primary Examiner*—Linda L. Gray
*Attorney, Agent, or Firm*—Sughrue, Mion, Zinn, Macpeak & Seas, PLLC

[57] ABSTRACT

An elongate light-shield film is withdrawn for a length corresponding to the width of a photosensitive film by a light-shield film supply mechanism, cut off into a light-shield film by a first cutting mechanism, and fed to an overlapping position by a feeding and positioning mechanism. In the overlapping position, a transverse end of the light-shield film is caused to overlap a longitudinal end of the photosensitive film, and the overlapping ends are cut off by a second cutting mechanism. Abutting ends of the light-shield film and the photosensitive film are then joined to each other by a tape, and the light-shield film and the photosensitive film which are thus joined are around on a spool. Debris produced when the overlapping ends are cut off is automatically discharged.

8 Claims, 12 Drawing Sheets

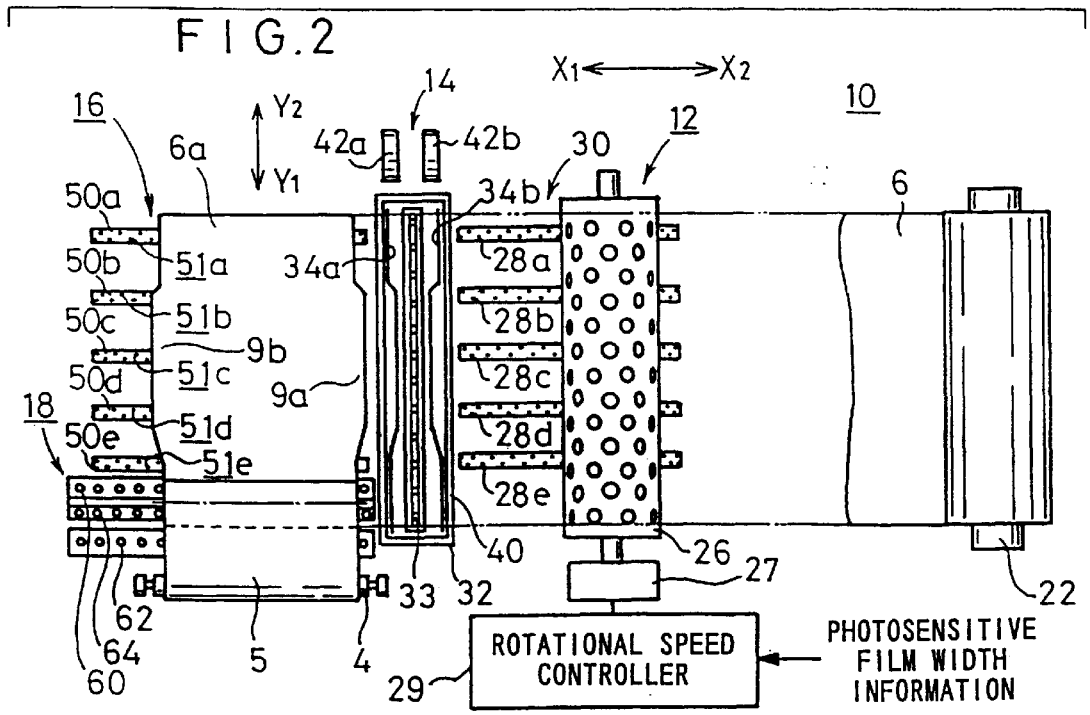
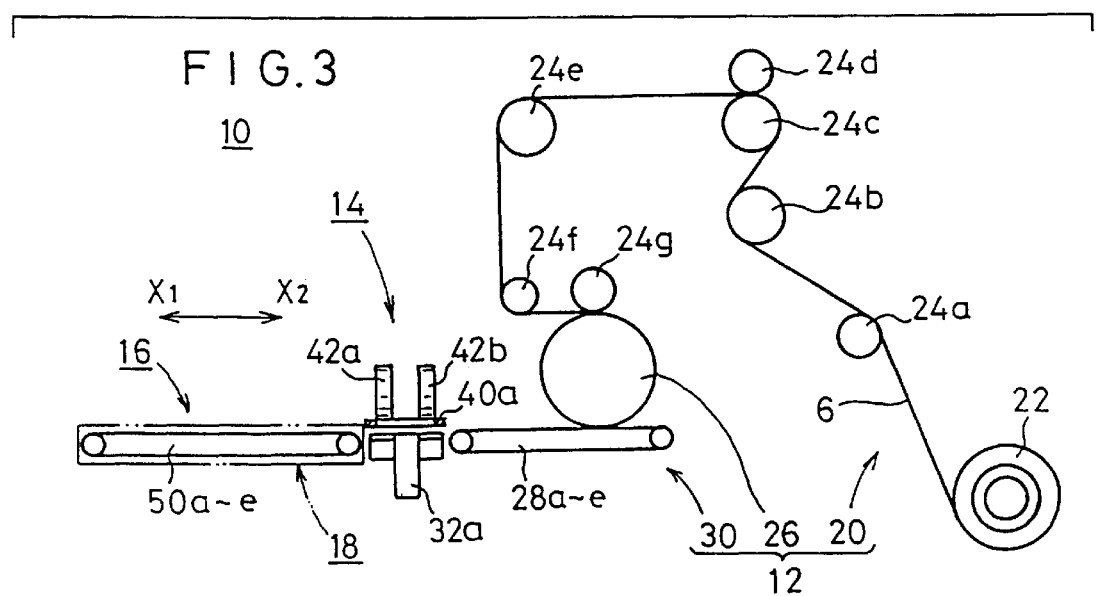

PRIOR ART

METHOD OF AND APPARATUS FOR APPLYING LIGHT-SHIELD MEMBER TO PHOTOSENSITIVE MEMBER

BACKGROUND OF THE INVENTION

1. Field of the Invention

The present invention relates to a method of and an apparatus for applying a light-shield member to a photosensitive member, and more particularly to a method of and an apparatus for applying a light-shield member to a photosensitive member by delivering the light-shield member in a direction perpendicular to the photosensitive member, which is of the type to be loaded in a bright room, joining an end of the light-shield member to an end of the photosensitive member, and thereafter winding the light-shield member on an outermost layer of the photosensitive member.

2. Description of the Related Art

Some photosensitive products comprise a photosensitive member, which is of the type to be loaded into an exposure device in a bright room, and a light-shield member such as a light-shield film wound on an outermost layer of the photosensitive member.

For packaging a photosensitive member with a light-shield member, it has heretofore been customary to take out the light-shield member, cut off the light-shield member into predetermined dimensions, deliver and position the severed light-shield member with respect to the photosensitive member, cut off ends of the light-shield member and the photosensitive member, hold them in abutment against each other, and join the abutting ends to each other. In the packaging process, the light-shield member is supplied to the end of the photosensitive member in a longitudinal direction thereof. It is necessary to remove any debris cut off from the light-shield member and the photosensitive member. For carrying out the packaging process, therefore, various different technologies are required. For example, these various different technologies include, among others, (a) the delivering and positioning of the light-shield member, (b) the cutting off of the light-shield member into predetermined dimensions, (c) the joining of the light-shield member and the photosensitive member to each other, and (d) the processing of debris cut off from the light-shield member and the photosensitive member.

Conventional arrangements for performing (a) the delivering and positioning of the light-shield member are disclosed in Japanese laid-open patent publications Nos. 59-219198, 1-256459, and 5-338877. These publications disclose that a sheet-like member is delivered by a belt conveyor and stopped and positioned by pins and nip rollers. If the light-shield member is in the form of a web, typically a light-shield film whose surface a low coefficient of friction and which is of low rigidity, then it is difficult to deliver the web with a belt conveyor and stop and position the web with pins and nip rollers.

Japanese laid-open patent publication No. 9-43781 reveals a known technique for carrying out (b) the cutting off of the light-shield member into predetermined dimensions. Generally, it is known to prepare light-shield members of different widths for use with photosensitive members of different widths, in relation to the cutting off of the light-shield member into predetermined dimensions. The preparation of light-shield members of different widths is necessary because a light-shield member and a photosensitive member have to be of the same width in order to hold their ends in abutment against each other and join them to each other. For a given photosensitive member, therefore, a light-shield member whose width matches the width of the given photosensitive member needs to be selected from the prepared light-shield members and then to replace any existing light-shield member. If there are many available photosensitive members of different widths, then it is highly tedious and time-consuming to select a matching light-shield member and replace any existing light-shield member with the selected light-shield member. Furthermore, a material loss tends to be large due to debris produced when light-shield members are cut off.

Prior processes for abutting and joining ends of a light-shield member and a photosensitive member to each other, in connection with the above process (c), are known from Japanese laid-open patent publications Nos. 54-91676 and 60-48858. According to the known processes, an end of a light-shield member having a predetermined width is positioned in abutment against an end of a photosensitive member, and then the abutting ends are joined to each other. However, these processes are disadvantageous in that when the light-shield member and the photosensitive member are delivered to a joining mechanism, they are liable to be displaced out of a desired joining position and cannot well be joined to each other.

FIGS. 15 through 17 of the accompanying drawings show unwanted joined states resulting from the above processes. FIG. 15 illustrates the manner in which a light-shield member "a" supplied from its blank roll is positioned obliquely with respect to a photosensitive member "b" and joined to the photosensitive member "b" by a joining tape "c". FIG. 16 illustrates the manner in which a light-shield member "a" is transversely displaced out of alignment with a photosensitive member "b" due to poor positioning accuracy, and joined to the photosensitive member "b" by a joining tape "c". FIG. 17 illustrates the manner in which a light-shield member "a" that is narrower than a photosensitive member "b" is joined to the photosensitive member "b" by a joining tape "c".

The joined states shown in FIGS. 15 through 17 may happen at the same time to cause a combined joining failure. Any of the undesired joined states shown in FIGS. 15 through 17 should be avoided because they will impair the light shielding capability for the photosensitive member "b".

As the process of carrying out (d) the processing of debris cut off from the light-shield member and the photosensitive member, a process of automatically discharging debris using a belt conveyor or an air chute is disclosed in Japanese laid-open patent publication No. 7-266291. The disclosed process is effective in discharging debris produced from highly rigid corrugated board or small-size punched debris. However, this process is not suitable for processing less rigid debris from a light-shield film, for example, and pieces of debris having different sizes, and fails to discharge debris from below members that are joined to each other.

SUMMARY OF THE INVENTION

It is a general object of the present invention to provide a method of and an apparatus for applying a light-shield member to a photosensitive member which has switched from another photosensitive member of a different width, by cutting off the light-shield member to a width that matches the width of the photosensitive member and joining the severed light-shield member to the photosensitive member, without having to prepare in advance another light-shield member whose length matches the width of the photosensitive member, so that high productivity and labor-saving capability can be achieved.

A major object of the present invention is to provide a method of and an apparatus for applying a light-shield member to a photosensitive member by smoothly delivering the light-shield member, accurately stopping and positioning the light-shield member, and reducing a material loss due to debris cut off from the light-shield member when the light-shield member and the photosensitive member are joined to each other.

According to the present invention, a first feeding mechanism feeds an elongate light-shield member in a direction transverse to a longitudinal direction of a rolled photosensitive member, and then a first cutting mechanism cuts off a leading end portion of the elongate light-shield member into a light-shield member having a predetermined shape corresponding to the width of the rolled photosensitive member. Thereafter, a second feeding mechanism feeds the light-shield member to an overlapping position and causes a transverse end of the light-shield member to overlap a longitudinal end of the rolled photosensitive member. In the overlapping position, a joining mechanism joins the light-shield member endwise to the rolled photosensitive member. Finally, an applying mechanism winds the light-shield member around the rolled photosensitive member thereby to apply the light-shield member to an outer circumferential surface of the rolled photosensitive member.

Even when the photosensitive member is changed to a new photosensitive member having a different width, the length of the light-shield member can be adjusted to the width of the new photosensitive member. Since the light-shield member of fixed width can be used with all available photosensitive member having different widths, it is not necessary to replace the light-shield member.

It is preferable to further provide a second cutting mechanism for cutting off the overlapping ends of the light-shield member and the rolled photosensitive member, and a debris discharging mechanism for automatically discharging debris produced by the second cutting mechanism.

According to the present invention, furthermore, the first cutting mechanism comprises a pair of cutter blades. Preferably, the cutter blades comprise fixed blades, and the first cutting mechanism has pressing means for pressing the elongate light-shield member against the fixed blades. Preferably, the pressing means comprises a pair of presser rollers, and the first cutting mechanism further comprises a suction box for attracting the elongate light-shield member, and a holder frame for holding the elongate light-shield member against the fixed blades.

With the above arrangement, it is possible to simultaneously cut a trailing end of the light-shield member and a leading end of the elongate light-shield member in a single cutting cycle. Since the elongate light-shield member is cut when it is pressed against the fixed blades by the holder frame, the elongate light-shield member can be cut with highly dimensional accuracy without sagging or being positionally displaced. If sides of the fixed blades are surrounded by resilient members, then when the elongate light-shield member is pressed by the presser rollers, the resilient members are compressed, allowing the elongate light-shield member to contact the fixed blades and be cut thereby. After the cutting of the elongate light-shield member, the presser rollers are elevated, and the resilient members are expanded back to surround the fixed blades. Therefore, the light-shield member is not cut or otherwise damaged by the fixed blades when the light-shield member is subsequently fed.

The first feeding mechanism comprises length varying means for varying the length of the light-shield member. Therefore, the length of the light-shield member can simply and accurately be adjusted to match the width of the rolled photosensitive member which may be changed.

Moreover, the first feeding mechanism comprises a suction drum and first suction belts. The rotational speed of the suction drum is controlled by a rotational speed control means. The suction drum is controlled by the rotational speed control means to withdraw a length of the light-shield member which matches the width of the rolled photosensitive member. The first suction belts held in rolling contact with the suction drum should preferably driven in synchronism with the suction drum.

The second feeding mechanism preferably feeds the light-shield member for a length corresponding to the width of the rolled photosensitive member while attracting the light-shield member.

The length of the elongate light-shield member can thus be fed and cut off accurately, and positioned easily in the overlapping position.

According to the present invention, furthermore, a second cutting mechanism cuts off the overlapping ends of the light-shield member and the rolled photosensitive member. Abutting ends of the light-shield member and the rolled photosensitive member, which are produced by the second cutting mechanism, are joined by the joining mechanism. The light-shield member and the rolled photosensitive member can be joined at their abutting ends, rather than overlapping ends or spaced ends.

In this manner, the transverse end of the light-shield member and the longitudinal end of the rolled photosensitive member, which are held in the overlapping position, can be cut off in one cutting cycle and joined to each other.

Preferably, the second cutting mechanism comprises a plurality of suction boxes for attracting the ends of the light-shield member and the rolled photosensitive member in position, and an upper rotary blade and a lower blade for cutting off the overlapping ends of the light-shield member and the rolled photosensitive member in coaction with each other thereby to produce the abutting ends of the light-shield member and the rolled photosensitive member, the lower blade being disposed between the suction boxes. The joining mechanism comprises means for joining the abutting ends while attracting the light-shield member and the rolled photosensitive member.

The second cutting mechanism comprises a pair of guide rollers disposed one on each side of the upper rotary blade for pressing the upper rotary blade, and side pressure adjusting means for adjusting a side pressure of the upper rotary blade. The upper rotary blade is displaced by a ball screw or the like in a direction to cut off the overlapping ends. The light-shield member and the photosensitive member can thus be cut off with high dimensional accuracy without flexing and being positionally displaced.

Debris cut off the light-shield member when the overlapping ends of the light-shield member and the photosensitive member are cut off is automatically discharged by the debris discharging mechanism. The debris drops below the joined ends of the light-shield member and the photosensitive member, and hence can be discharged highly efficiently unlike the conventional arrangement in which it is difficult to discharge such debris.

The debris discharging mechanism comprises a suction box for attracting the debris, a chuck mechanism for holding the debris, and a stock tray for storing the debris. The debris discharging mechanism thus constructed is capable of efficiently and automatically discharging debris that is present beneath the joined ends of the light-shield member and the photosensitive member.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a fragmentary plan view of an applying apparatus according to an embodiment of the present invention;

FIG. 3 is a schematic side elevational view of a first feeding mechanism, a first cutting mechanism, and a second feeding mechanism of the applying apparatus shown in FIG. 2;

DESCRIPTION OF THE PREFERRED EMBODIMENTS

Figure 1:
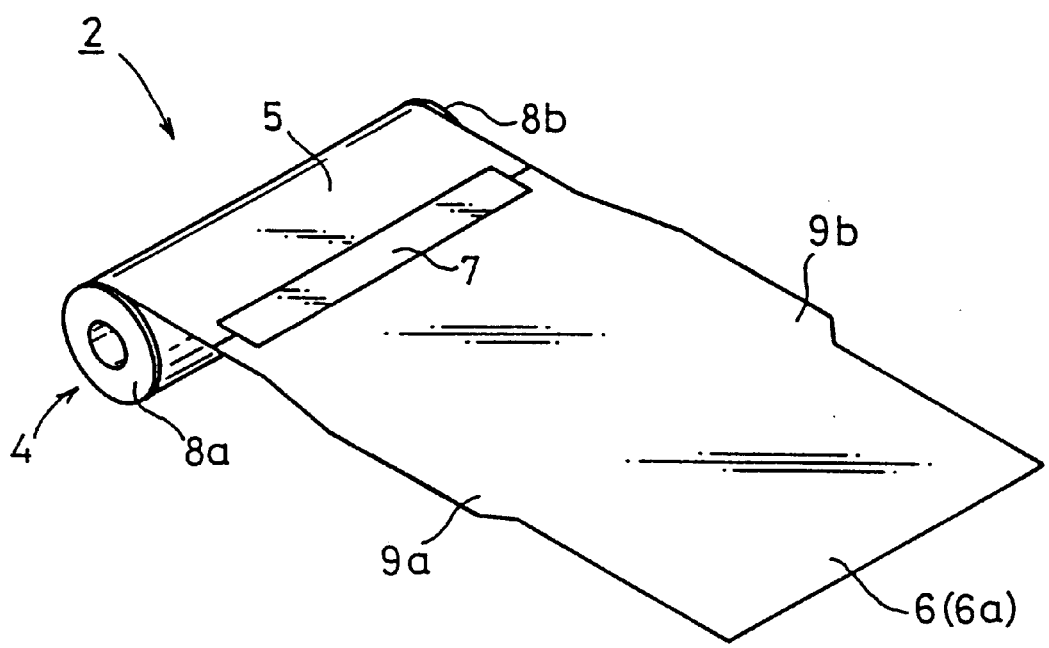
FIG. 1 is a perspective view of a roll film used in the present invention.

According to the present invention, a photosensitive member to which a light-shield member is to be applied is in the form of a roll film, and the light-shield member is in the form of a light-shield film. As shown in FIG. 1, a roll film 2 comprises a photosensitive film 5 wound around a spool 4, and a light-shield film 6a having an end joined by an adhesive tape 7 to the end of the photosensitive film 5. The light-shield film 6a is severed from a light-shield film 6 supplied from a light-shield film roll. The photosensitive film 5 and the light-shield film 6a may alternatively be joined to each other by heat sealing.

The spool 4 has a pair of light-shield flanges 8a, 8b disposed respectively on opposite longitudinal ends thereof, and the photosensitive film 5 is wound on the spool 4 axially between the light-shield flanges 8a, 8b. The light-shield film 6a has a pair of wings 9a, 9b projecting laterally from respective opposite side edges thereof. When the light-shield film 6a joined to the photosensitive film 5 is wound on the spool 4, the wings 9a, 9b reach the light-shield flanges 8a, 8b. Therefore, the outer circumferential surface of the photosensitive film 5 wound on the spool 4 is fully covered with the light-shield film 6a and hence shielded from light by the light-shield film 6a.

FIGS. 2 and 3 show an applying apparatus 10 according to an embodiment of the present invention, for cutting off a supplied light-shield film 6 into a light-shield film 6a and joining the light-shield film 6a to a photosensitive film 5 wound on a spool 4. The applying apparatus 10 basically comprises a light-shield film supply mechanism (first feeding mechanism) 12 for supplying a light-shield film 6, a first cutting mechanism 14 for cutting the supplied light-shield film 6 to a length matching the width of the photosensitive film 5, a feeding and positioning mechanism (second feeding mechanism) 16 for feeding and positioning the light-shield film 6a severed by the first cutting mechanism 14, a taping mechanism (joining mechanism) 100 (see FIG. 9) for joining ends of the light-shield film 6a and the photosensitive film 5, and an applying mechanism, described later on. The applying apparatus 10 also has a second cutting mechanism 18 for severing the overlapping ends of the light-shield film 6a and the photosensitive film 5, and a debris discharging mechanism (see FIG. 12) for discharging debris produced when the overlapping ends of the light-shield film 6a and the photosensitive film 5 are severed by the second cutting mechanism 18.

The light-shield film supply mechanism 12 will first be described below. As shown in FIG. 3, the light-shield film supply mechanism 12 has a light-shield film supply system 20, a suction drum 26, and a suction feed system 30.

The light-shield film supply system 20 comprises a light-shield film roll 22 of an elongate light-shield film 6, and a plurality of feed rollers 24a through 24g for supplying the light-shield film 6 from the light-shield film roll 22 to the first cutting mechanism 14. The feed roller 24g is movable toward and away from the suction drum 26 which is of a relatively large diameter.

The suction drum 26 comprises a hollow cylinder having a number of through holes defined in a cylindrical wall thereof. The interior space of the suction drum 26 is connected to an evacuating mechanism, e.g., a vacuum pump (not shown). When the evacuating mechanism is actuated, the suction drum 26 draws the light-shield film 6 toward, or attracts the light-shield film 6 against, an outer circumferential surface thereof. The suction drum 26 has an axial end connected to a servomotor 27 as an actuator through a transmission mechanism (not shown). The rotational speed of the servomotor 27 can accurately be controlled by a rotational speed controller 29.

The rotational speed controller 29 is supplied with information of the width of the photosensitive film 5, effects calculations based on the supplied width information, and sets the rotational speed of the servomotor 27 to a rotational speed setting corresponding to the supplied width information. As a result, the rotational speed of the servomotor 27 can be controlled to feed the light-shield film 6 for a length matching the width of the photosensitive film 5.

The suction feed system 30 is disposed underneath the suction drum 26. The suction feed system 30 comprises a plurality of first suction belts 28a–28e held in rolling contact with the suction drum 26. The first suction belts 28a–28e are relatively narrow, extend parallel to each other, and are transversely spaced from each other at constant intervals. Each of the first suction belts 28a–28e has a number of through holes defined therein which are connected to the evacuating mechanism. The first suction belts 28a–28e can be moved by the servomotor 27 in synchronism with the suction drum 26. Since the first suction belts 28a–28e are movable in synchronism with the suction drum 26, the light-shield film 6 can be fed sufficiently for a desired length.

Figure 4:
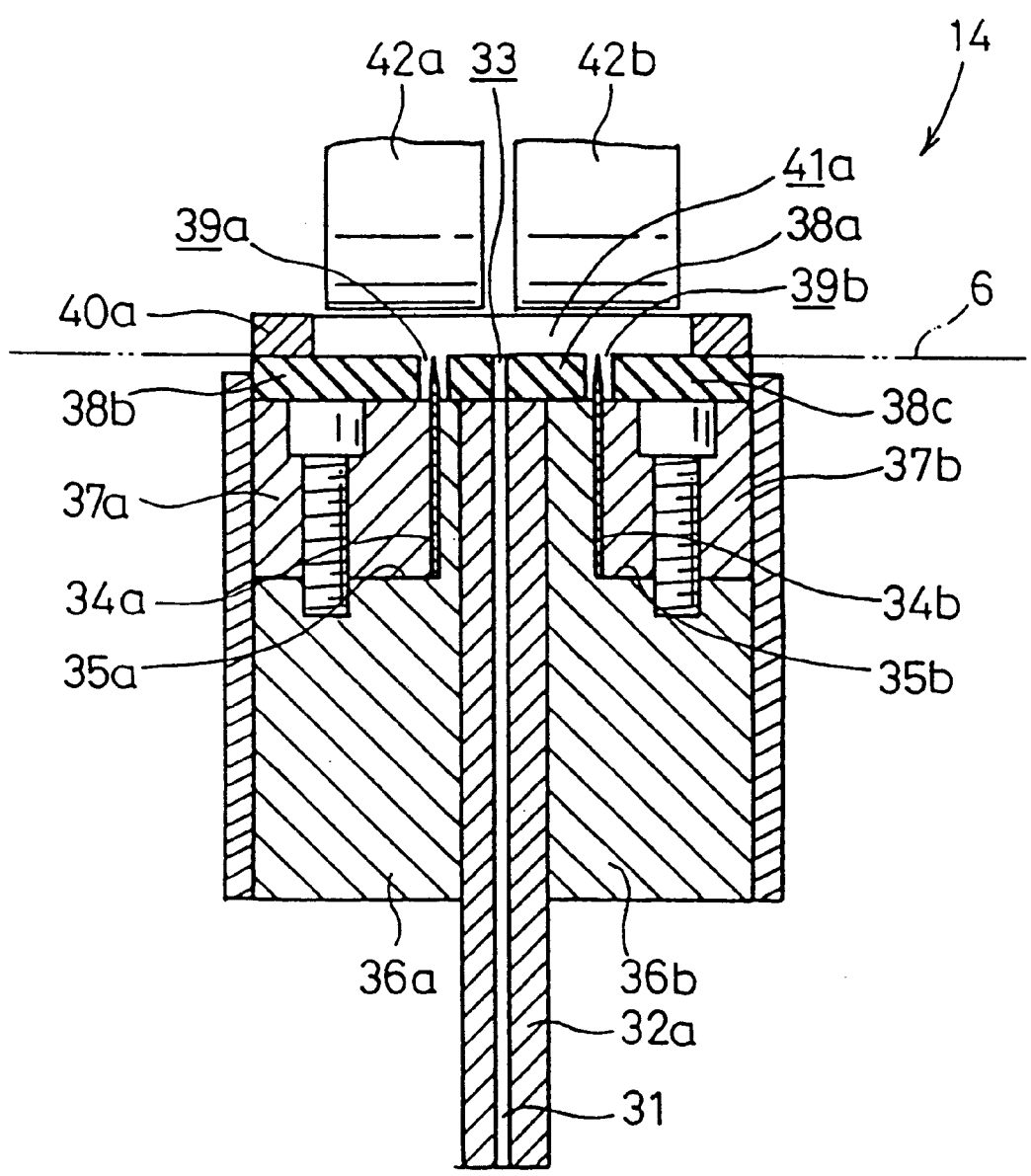
FIG. 4 is an enlarged vertical cross-sectional view of the first cutting mechanism.

As shown in FIGS. 2 and 3, the first cutting mechanism 14 is positioned downstream of the suction feed system 30 with respect to the direction in which the light-shield film 6 is fed. As shown in FIG. 4, the first cutting mechanism 14 has a pair of bases 36a, 36b spaced from each other and defining therebetween a vertical hole through which a suction box 32a is vertically movably inserted. The suction box 32a has a plurality of suction holes 31 defined longitudinally therein and connected to the evacuating mechanism.

The bases 36a, 36b have respective recesses 35a, 35b defined in upper portions thereof. The first cutting mechanism 14 has a pair of cutter blades 34a, 34b erected in abutment against vertical walls of the recesses 35a, 35b. The cutter blades 34a, 34b are clamped in position by fixing blocks 37a, 37b fastened to the bases 36a, 36b, respectively. Therefore, the cutter blades 34a, 34b serve as fixed blades fixed by the fixing blocks 37a, 37b.

In FIG. 4, the bases 36a, 36b, the suction box 32a, and the fixing blocks 37a, 37b have respective upper surfaces lying flush with each other. Elastomeric members, preferably, urethane rubber members 38a, 38b, 38c are fixedly mounted on the upper surfaces of the suction box 32a and the fixing blocks 37a, 37b. The urethane rubber members 38b, 38c have respective upper surfaces lying flush with the urethane rubber member 38a. The urethane rubber members 38a, 38b, 38c define holes 39a, 39b therebetween which receive upper tip ends of the cutter blades 34a, 34b that are positioned slightly lower than the upper surface of the urethane rubber member 38a.

As shown in FIG. 4, the suction holes 31 defined longitudinally in the suction box 32a communicate with an elongate hole 33 defined in the urethane rubber member 38a. The upper surfaces of the urethane rubber members 38b, 38c are surrounded by a vertically movable holder frame 40a which has an opening 41a defined therein into which a pair of presser rollers 42a, 42b can move vertically. The holder frame 40a comprises a rectangular frame, as viewed in plan, for holding an end of a light-shield film 6 positioned around the cutter blades 34a, 34b when the presser rollers 42a, 42b are lowered.

The presser rollers 42a, 42b are disposed upwardly of the cutter blades 34a, 34b for vertical movement and also displacement in the directions indicated by the arrows $Y_1$, $Y_2$ in FIG. 2. The presser rollers 42a, 42b can be displaced in the directions indicated by the arrows $Y_1$, $Y_2$ by a ball screw (not shown) which is actuated by an induction motor controlled by an inverter.

Figure 5:
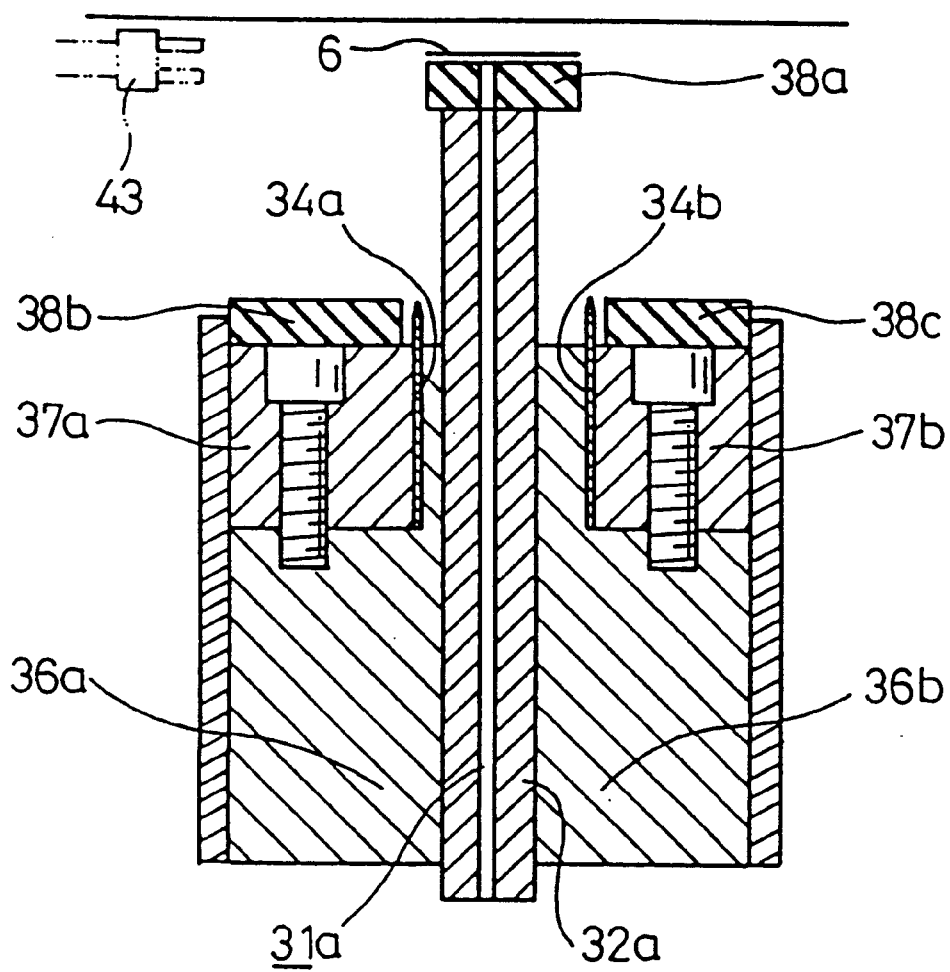
FIG. 5 is an enlarged vertical cross-sectional view of a suction box of the first cutting mechanism shown in FIG. 4, the suction box being shown as being elevated.

The first cutting mechanism 14 has a returning mechanism for returning the suction box 32a and the cutter blades 34a, 34b to a pre-cutting position shown in FIG. 4 after having cut off the end of the light-shield film 6. Specifically, after the cutter blades 34a, 34b have cut off the end of the light-shield film 6, the suction box 32a and the cutter blades 34a, 34b which are disposed one on each side of the suction box 32a are first lowered in unison with each other. Then, for discharging the debris, only the suction box 32a is elevated as shown in FIG. 5. Thereafter, the suction box 32a is lowered to the position as shown in FIG. 4. The suction box 32a and the cutter blades 34a, 34b can thus be moved by a cam and crank mechanism or a link mechanism.

As shown in FIG. 5, a chuck mechanism 43 is provided for movement perpendicular to the longitudinal direction of the suction box 32a. After the cutter blades 34a, 34b have cut off the end of the light-shield film 6, the chuck mechanism 43 moves in one direction, grips the debris above the suction box 32a, and moves in the opposite direction away from the suction box 32a to remove the debris.

Figure 6:
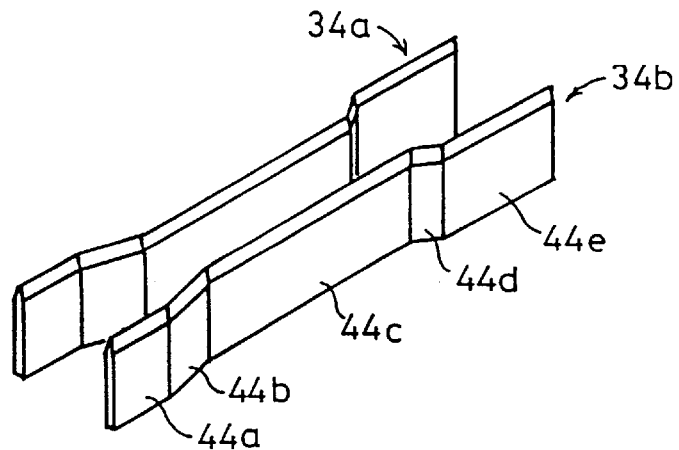
FIG. 6 is a perspective view of cutter blades of the first cutting mechanism.

The cutter blades 34a, 34b are shown in detail in FIG. 6. The cutter blade 34b comprises a first blade segment 44a on one end, a second blade segment 44b bent from the first blade segment 44a, a third blade segment 44c bent at an angle from the second blade segment 44b and extending substantially parallel to the first straight blade segment 44a, a fourth blade segment 44d bent at a greater angle than the second blade segment 44b toward the same side as the second blade segment 44b, and a fifth blade segment 44e bent from the fourth blade segment 44d and extending substantially parallel to the first straight blade segment 44a. The cross-sectional shape of the cutter blade 34b is complementary to the shape of a side edge of the light-shield film 6a shown in FIG. 1. That is, the cutter blade 34b produces the wing 9b on one side edge of the light-shield film 6a cut off from the light-shield film 6.

The cutter blade 34a is of a structure similar to the cutter blade 34b, except that the shape of the cutter blade 34a is in symmetrical relation to the cutter blade 34b. The cutter blade 34a produces the wing 9a on the other side edge of the light-shield film 6a cut off from the light-shield film 6. Each of the cutter blades 34a, 34b is shown as having a cutting edge that is ground on both sides, but may have a cutting edge that is ground on one side only.

Figure 7:
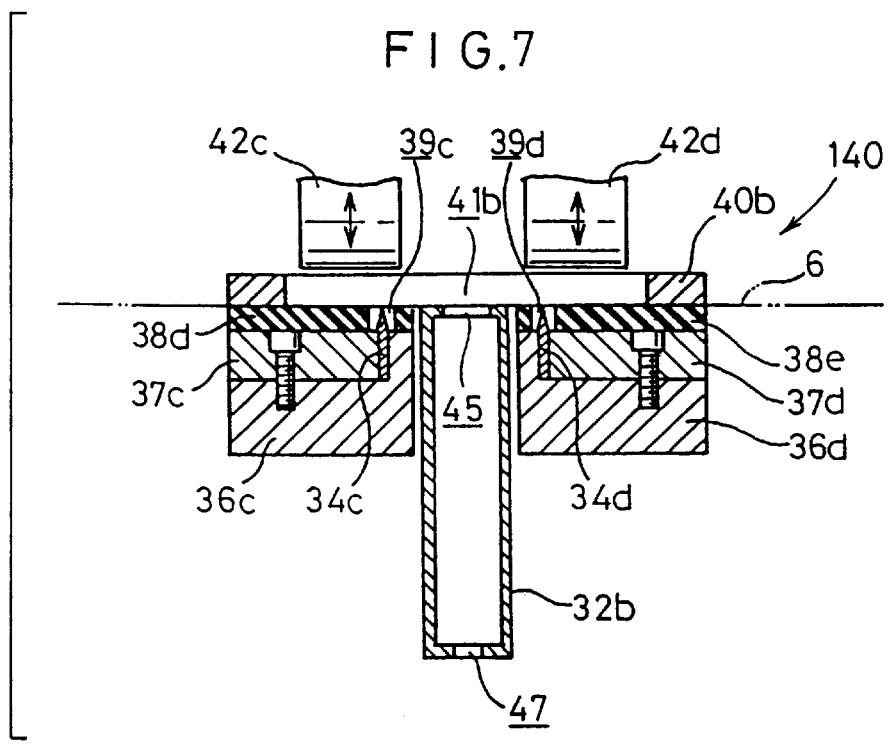
FIG. 7 is a vertical cross-sectional view of a first cutting mechanism according to another embodiment of the present invention.

The first cutting mechanism 14 shown in FIGS. 4 and 5 may be replaced with a first cutting mechanism 140 according to another embodiment shown in FIG. 7.

The first cutting mechanism 140 is basically the same as the first cutting mechanism 14 shown in FIGS. 4 and 5, but differs therefrom with respect to the structure of a suction box. As shown in FIG. 7, the first cutting mechanism 140 has a suction box 32b disposed centrally therein which is of a hollow structure and has a plurality of holes 47 defined longitudinally in a bottom wall thereof and held in communication with the evacuating mechanism. The suction box 32b has an opening 45 defined in an upper wall thereof.

Other details of the first cutting mechanism 140 are similar to those of the first cutting mechanism 14 shown in FIGS. 4 and 5. Specifically, cutter blades 34c, 34d are clamped in position by fixing blocks 37c, 37d fastened to bases 36c, 36d, respectively. Planar urethane rubber members 38d, 38e are fixedly mounted on the upper surfaces of the bases 36c, 36d and the fixing blocks 37c, 37d. The urethane rubber members 38d, 38e have respective holes 39c, 39d shaped complementarily to the cutter blades 34c, 34d. A vertically movable presser frame 40b is disposed on the urethane rubber members 38d, 38e. The presser frame 40b has an opening 41b defined therein into which a pair of presser rollers 42c, 42d can move vertically.

The feeding and positioning mechanism 16 disposed downstream of the first cutting mechanism 14 will be described below.

The feeding and positioning mechanism 16 is of substantially the same structure as the suction feed system 30. As shown in FIGS. 2 and 3, the feeding and positioning mechanism 16 comprises a plurality of second suction belts 50a–50e which extend parallel to each other and are transversely spaced from each other at constant intervals. The second suction belts 50a–50e are slightly longer in the direction of feed than the first suction belts 28a–28e of the suction feed system 30.

Figure 8:
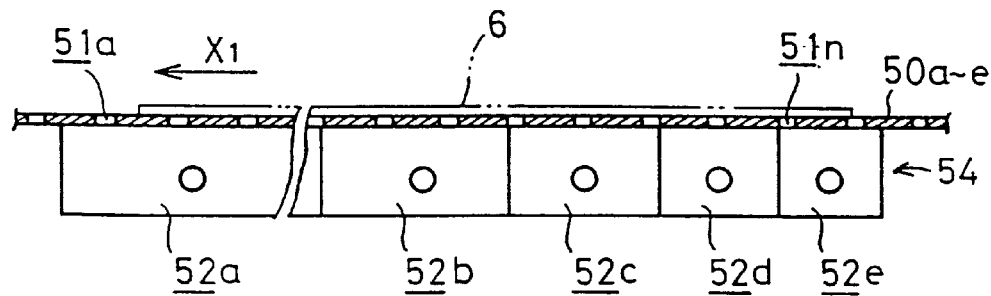
FIG. 8 is a side elevational view, partly in cross section, of a suction belt and a suction box of the second feeding mechanism shown in FIG. 3.

As shown in FIG. 8, each of the second suction belts 50a–50e has a number of through holes 51a through 51n defined therein. The second suction belts 50a–50e are positioned about a suction box 54 that is divided into a plurality of chambers 52a through 52e connected to an evacuating mechanism (not shown). The chambers 52a through 52e are associated with respective solenoid-controlled directional control valves (not shown) which control a fluid flow between the chambers 52a through 52e and the evacuating mechanism for thereby selectively developing a positive or negative pressure in the chambers 52a through 52e. When a negative pressure is developed in the chambers 52a through 52e, a film, e.g., a light-shield film 6, on the second suction belts 50a–50e is fed thereby while at the same time they are being attracted by a vacuum acting through the through holes 51a–51n in the second suction belts 50a–50e.

The second suction belts 50a–50e are movable by a servomotor (not shown) which is different from the servomotor 27. However, the servomotor for moving the second suction belts 50a–50e should preferably be energized in accurate synchronism with the suction drum 26 and the first suction belts 28a–28e.

The second cutting mechanism 18 which is provided at the downstream with respect to the feeding and positioning mechanism 16 will be described below.

Figure 9:
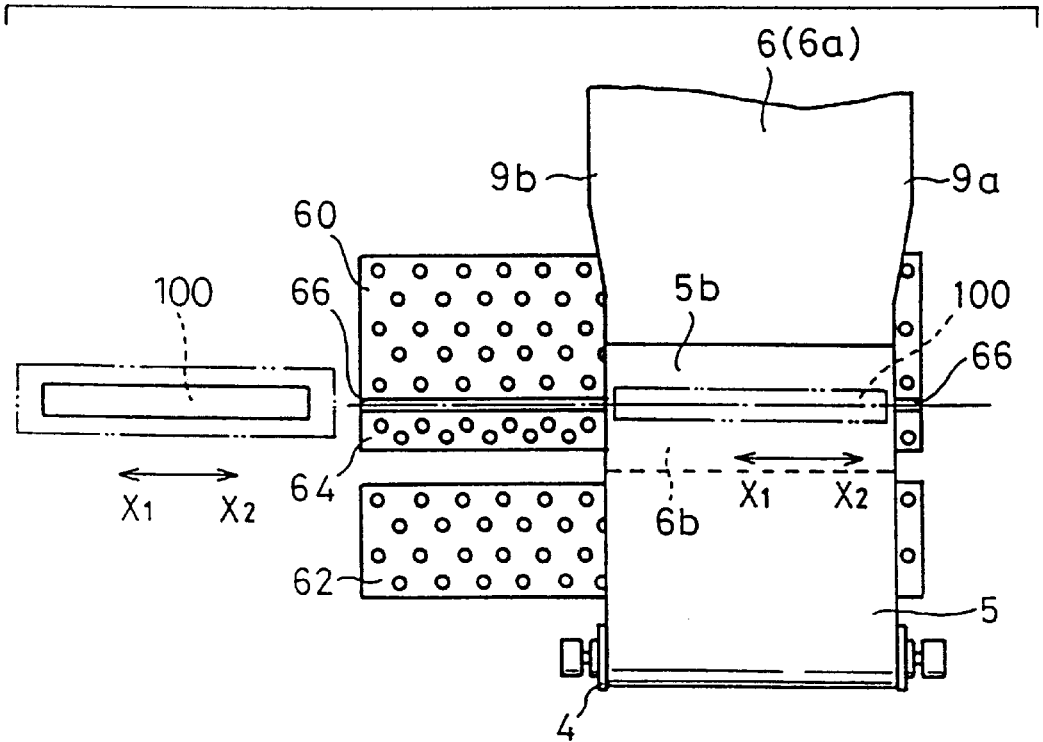
FIG. 9 is a plan view of a second cutting mechanism and a taping mechanism of the applying apparatus shown in FIG. 2.

As shown in FIG. 9, the second cutting mechanism 18 comprises a first suction box 60, a second suction box 62 spaced a given distance from the first suction box 60, and a third suction box 64 disposed between the first suction box 60 and the second suction box 62 and displaceable vertically, i.e., in directions normal to the sheet of FIG. 9.

An elongate lower blade 66 fixed to the first suction box 60 is positioned between the first suction box 60 and the third suction box 64. A rotary blade mechanism 68 shown in FIG. 10 has a rotary blade 78 which is positioned as an is upper blade above the lower blade 66 in alignment therewith.

The rotary blade mechanism 68 will be described below.

Figure 10:
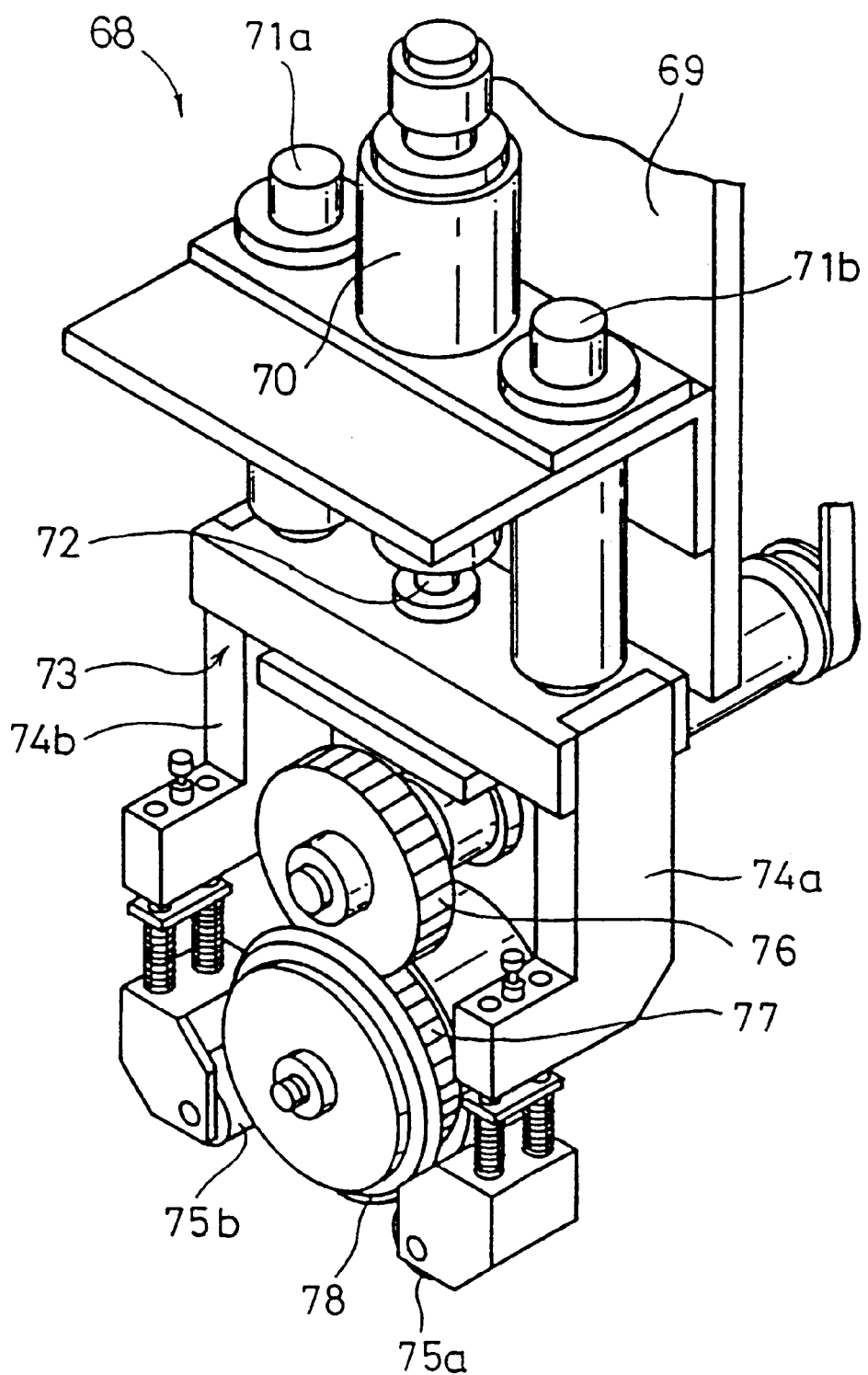
FIG. 10 is an enlarged perspective view of a rotary blade mechanism of the second cutting mechanism.

As shown in FIG. 10, the rotary blade mechanism 68 has a vertical cylinder 70 held by a support plate 69. The cylinder 70 is flanked by vertical guide rods 71a, 71b for guiding vertical movement of a cylinder rod 72 extending from the vertical cylinder 70.

A holder 73 is mounted on the lower distal end of the cylinder rod 72. The holder 73 has first and second L-shaped arms 74a, 74b extending downwardly and horizontally spaced a given distance from each other. First and second guide rollers 75a, 75b are rotatably and vertically resiliently supported respectively on lower horizontal members of the first and second L-shaped arms 74a, 74b. A gear 76 is rotatably positioned between the first and second L-shaped arms 74a, 74b and held in driving mesh with a gear 77 mounted coaxially on the rotary blade 78.

Figure 11:
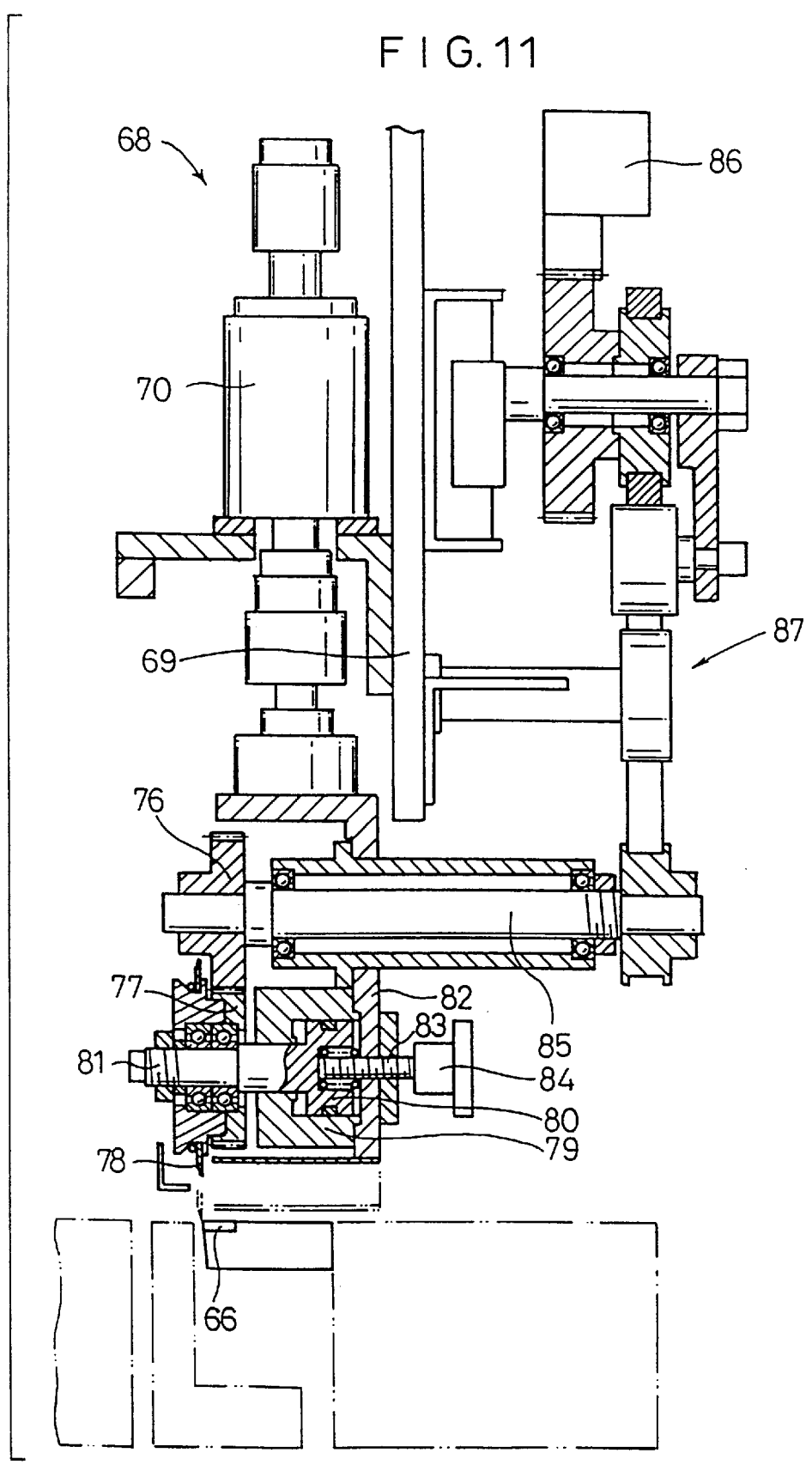
FIG. 11 is a vertical cross-sectional view of the rotary blade mechanism shown in FIG. 10.

As shown in FIG. 11, the rotary blade mechanism 68 has a side pressure adjusting mechanism including a cylinder 79 disposed coaxially with the rotary blade 78 and housing an axially movable piston 80. The axially movable piston 80 houses a helical spring seated in a recess defined in one axial end therein. A piston rod extends horizontally from the other axial end of the piston 80 and is coaxially joined to a shaft 81 on which the rotary blade 78 and the gear 77 are coaxially mounted. A screw 83 is horizontally threaded through a vertical side plate 82 disposed between the first arm 74a and the second arm 74b. The screw 83 can axially be moved back and forth when a knob 84 on one end of the screw 83 is manually turned. When the knob 84 is manually turned, the screw 83 is axially moved horizontally to displace the gear 77 and the rotary blade 78 in unison with each other.

When the cylinder 79 is actuated, the piston 80 is axially moved to axially displace the shaft 81 to push the rotary blade 78 outwardly into vertical alignment with the lower blade 66, as shown in FIG. 11. A horizontal shaft 85 coupled coaxially to the gear 76 is supported on the side plate 82. The shaft 85 is operatively connected to a motor 86 through a transmission mechanism 87. When the motor 86 is energized, the shaft 85 is rotated about its own axis by the transmission mechanism 87, thereby rotating the gears 76, 77 and hence the rotary blade 78.

Figure 12:
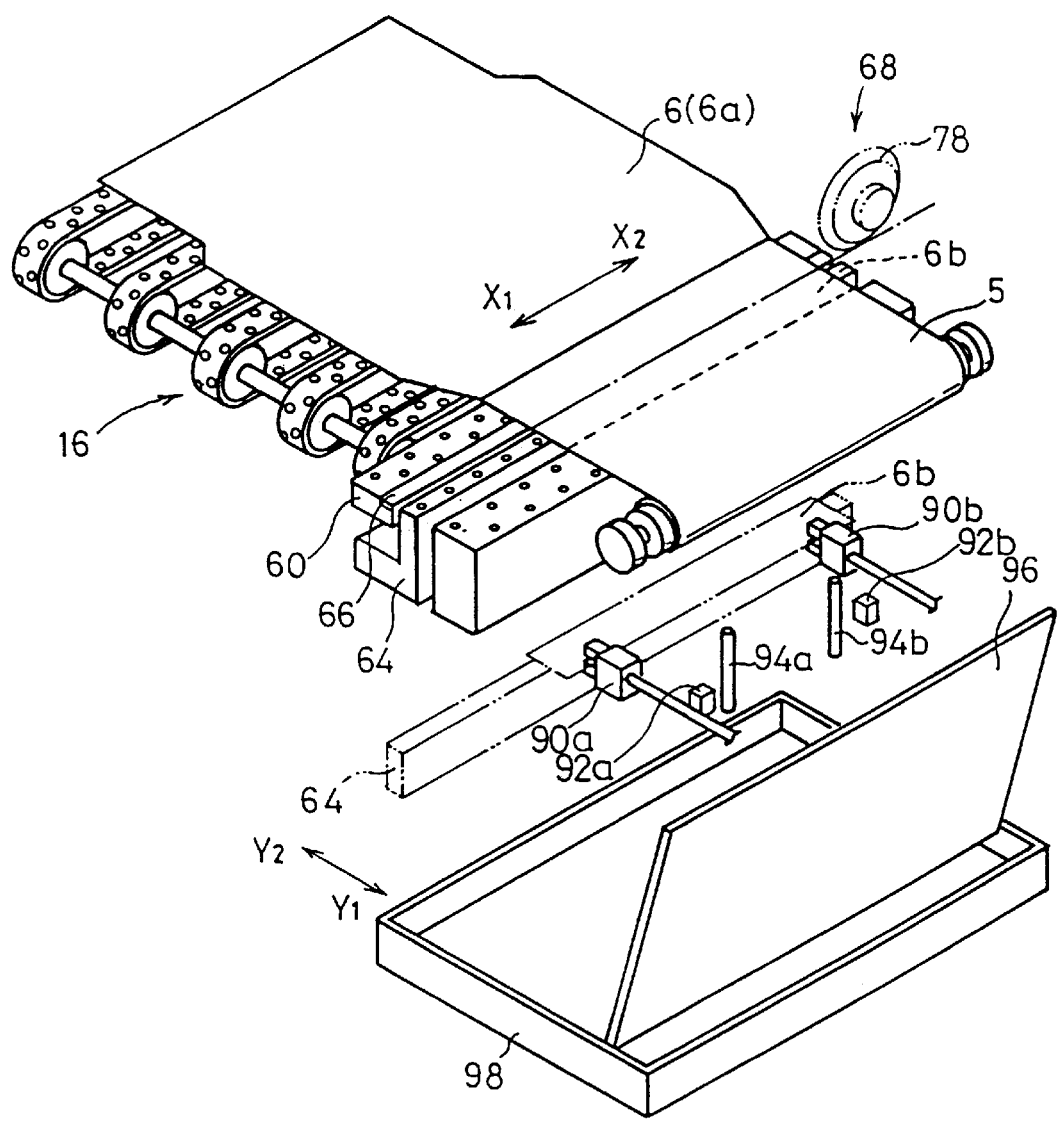
FIG. 12 is a perspective view of various components of a debris discharging mechanism of the applying apparatus shown in FIG. 2.

The rotary blade mechanism 68 can be displaced longitudinally along the first, second, and third suction boxes 60, 62, 64 in the directions indicated by the arrows $X_1$, $X_2$ in FIG. 12, by an actuator (not shown) such as a ball screw mechanism. The third suction box 64 is vertically displaceable by a linear actuator (not shown) such as a cylinder or the like, so that it can delivery downwardly debris 6b cut off the light-shield film 6 by the rotary blade 78 while attracting the debris 6b.

The debris discharging mechanism for discharging the debris 6b will be described below.

Figure 13:
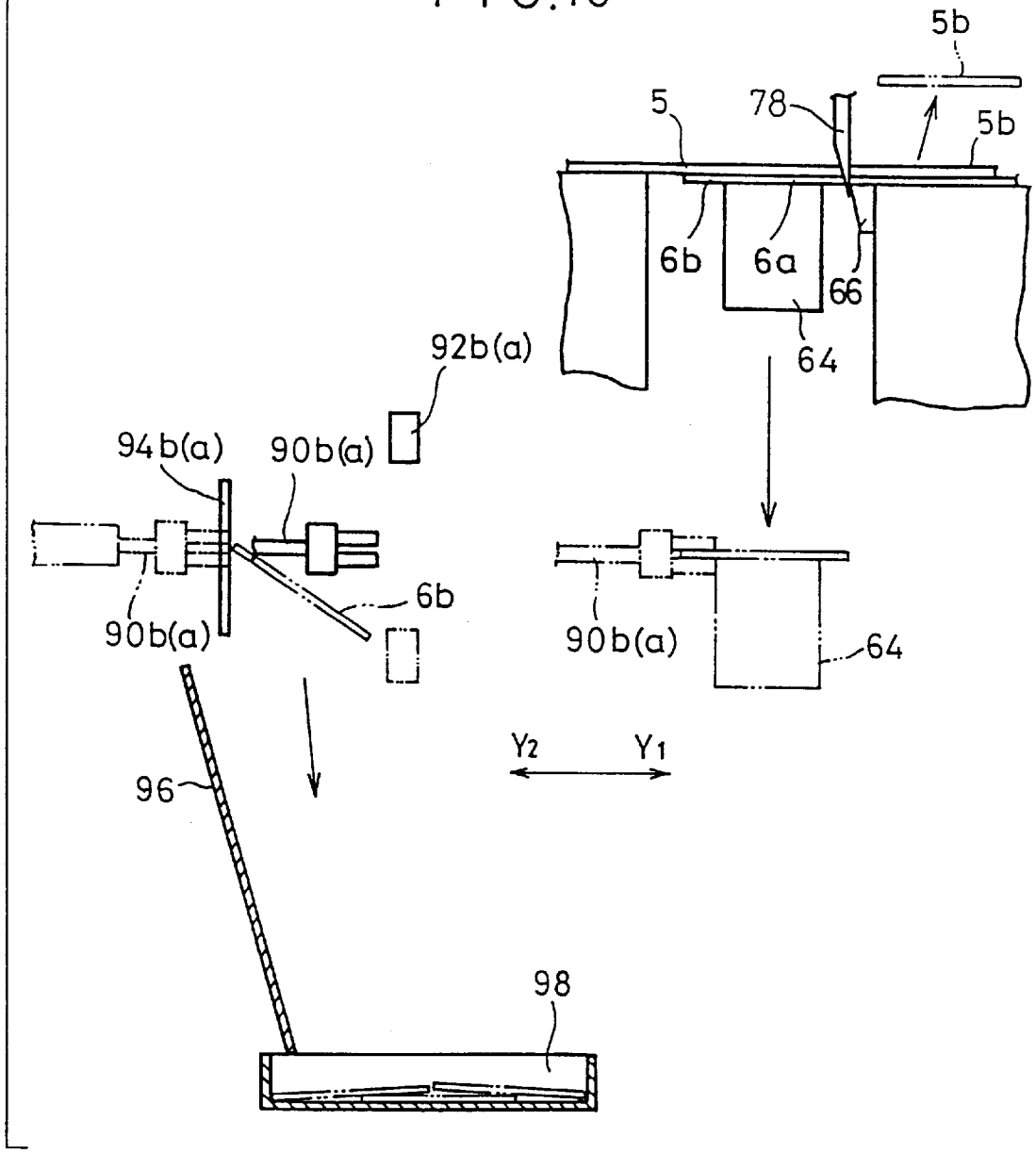
FIG. 13 is a side elevational view showing the manner in which the components of the debris discharging mechanism shown in FIG. 12 operate.

As shown in FIGS. 12 and 13, the debris discharging mechanism has a pair of chuck mechanisms 90a, 90b extend perpendicularly to the longitudinal axis of the third suction box 64 and movable back and forth toward and away from the third suction box 64, a pair of light detectors 92a, 92b positioned closely to the chuck mechanisms 90a, 90b, respectively, and a pair of vertical rods 94a, 94b disposed near and between the chuck mechanisms 90a, 90b, respectively.

The chuck mechanisms 90a, 90b can grip debris 6b, cut off the light-shield film 6, which is attracted by the third suction box 64, and deliver the gripped debris 6b away from the third suction box 64. The third suction box 64 thus serves as a component of the second cutting mechanism 18 and also a component of the debris discharging mechanism. The debris discharging mechanism also includes a stock tray 98 for storing the debris 6b delivered by the chuck mechanisms 90a, 90b and guided downwardly by a guide plate 96 after the debris 6b is released from the chuck mechanisms 90a, 90b.

Figure 14:
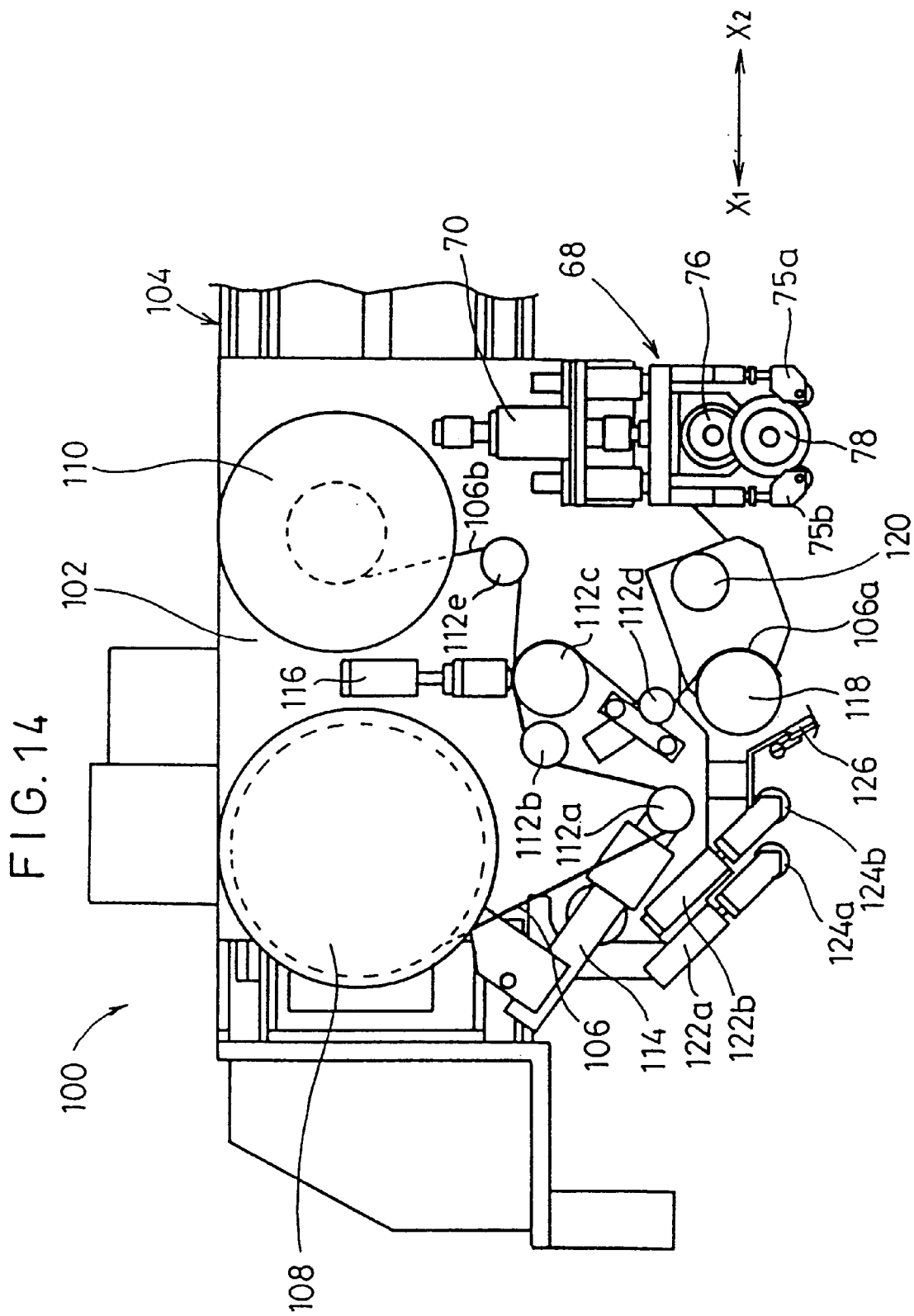
FIG. 14 is a side elevational view of the taping mechanism shown in FIG. 9.
Figure 15:
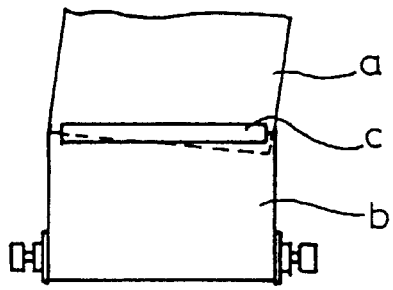
FIG. 15 is a fragmentary plan view showing an undesired joined state of a light-shield member and a photosensitive member.
Figure 16:
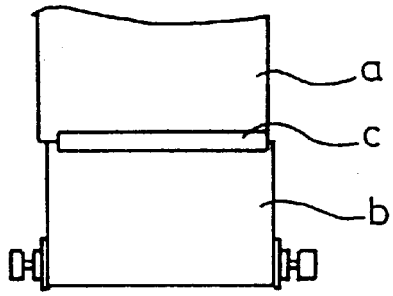
FIG. 16 is a fragmentary plan view showing another undesired joined state of a light-shield member and a photosensitive member.
Figure 17:
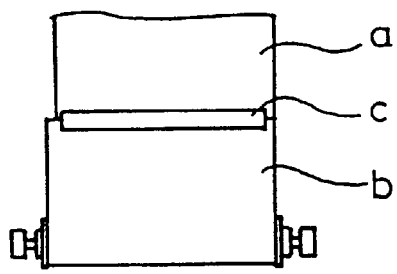
FIG. 17 is a fragmentary plan view showing still another undesired joined state of a light-shield member and a photosensitive member.

The taping mechanism 100 for joining ends of the light-shield film 6a and the photosensitive film 5 will be described below with reference to FIG. 14.

The taping mechanism 100 has a base 102 movable in the directions indicated by the arrows $X_1$, $X_2$ along a guide rail 104 which extend in the directions indicated by the arrows $X_1$, $X_2$.

On the base 102, there are rotatably supported a joining tape roll 108 of a joining tape 106 which comprises a joining tape sheet 106a and a peel-off sheet 106b, and a peel-off sheet takeup roller 110 positioned closely to the joining tape roll 108 for winding the peel-off sheet 106b only.

The taping mechanism 100 also includes auxiliary rollers 112a, 112b, 112c, 112d, 112e which are positioned below the joining tape roll 108. The auxiliary roller 112a is angularly movable to change its position by a link mechanism 114. A cylinder 116 is positioned upwardly of the auxiliary roller 112c for pressing the joining tape 106 against the auxiliary roller 112c. A presser roller 118 is angularly movably supported by a shaft 120 downstream of the auxiliary roller 112d. A cylinder 122a is disposed underneath the link mechanism 114 and has a cylinder rod which supports a presser roller 124a on its tip end. A cylinder 112b is disposed parallel to the cylinder 122a and has a cylinder rod which supports a presser roller 124b on its tip end. A tape cutter 126 is disposed between the presser roller 124b and the presser roller 118. The tape cutter 126 is displaceable in directions normal to the sheet of FIG. 14.

The light-shield film 6a and the photosensitive film 5 which have been joined by the taping mechanism 100 are wound on the spool 4 shown in FIGS. 2 and 9. When the light-shield film 6a and the photosensitive film 5 are wound on the spool 4, the light-shield film 6a is applied to the outer circumferential surface of the rolled photosensitive film 5. The spool 4 and a roller for rotating the spool 4 jointly serve as the applying mechanism.

Operation of the applying apparatus 10 will be described below.

A light-shield film 6 is supplied from the light-shield film supply system 20 of the light-shield film supply mechanism 12. Specifically, the light-shield film 6 is unreeled from the light-shield film roll 22, travels around the feed rollers 24a through 24g, and reaches the suction drum 26.

The evacuating mechanism, such as a vacuum pump, connected to the interior space of the suction drum 26 is actuated to attract the light-shield film 6 against the outer circumferential surface of the suction drum 26 as it is rotated by the servomotor 27. The leading end of the light-shield film 6 is gripped between the suction drum 26 and the first suction belts 28a–28e which are moved in synchronism with the suction drum 26, so that the light-shield film 6 is fed in the direction indicated by the arrow $X_1$ in FIGS. 2 and 3. The servomotor 27 is continuously energized until the leading end of the light-shield film 6 covers the urethane rubber member 38a on the suction box 32a or moves forward beyond the urethane rubber member 38a.

The rotational speed of the servomotor 27 is controlled according to a control signal supplied from the rotational speed controller 29. As described above, the control signal supplied from the rotational speed controller 29 is based on the information representing the width of a photosensitive film 5 being used, and serves to determine a rotational speed of the servomotor 27 to determine a rate at which the light-shield film 6 is fed. If another new photosensitive film 5 having a different width is used, then the rotational speed of the servomotor 27 is changed by the rotational speed controller 29 based on the information representing the new photosensitive film 5. As a result, the length to which the light-shield film 6 will be cut, as described later on, matches the width of the new photosensitive film 5.

In this manner, when the photosensitive film 5 is changed to a new photosensitive film 5 having a different width, the length to which the light-shield film 6 will be cut is automatically adjusted so as to match the width of the new photosensitive film 5. Accordingly, only one type of light-shield film 6 needs to be prepared for use with various photosensitive films 5 having different widths. Since the existing light-shield film 6 is not required to be changed, the operation of the applying apparatus 10 offers high productivity and labor-saving capability.

While the light-shield film 6 is being fed, it is strongly attracted by the suction drum 26 and the first suction belts 28a through 28e against slippage, displacement, sagging, or other positional misalignment, and hence will be joined accurately to the photosensitive film photosensitive film 5 as described later on.

When the light-shield film 6 is fed to the point where it covers at least the suction box 32a, the suction feed system 30 is inactivated. The leading end of the light-shield film 6 now temporarily stops on the first cutting mechanism 14 while being attracted to the suction box 32a through the suction holes 31. At this time, the suction drum 26 and the first suction belts 28a through 28e are held at rest, but they keep attracting the light-shield film 6.

Thereafter, the holder frame 40a is lowered by a linear actuator (not shown) to press the light-shield film 6 against the urethane rubber members 38a, 38b, 38c in a pattern according to the shape of the holder frame 40a. Then, the presser rollers 42a, 42b are lowered by a linear actuator (not shown) into the opening 41a of the holder frame 40a, pressing the light-shield film 6 and the urethane rubber members 38a, 38b, 38c together downwardly. Specifically, the urethane rubber members 38a, 38b, 38c are compressed downwardly by the presser rollers 42a, 42b, so that the upper tip ends of the cutter blades 34a, 34b projects upwardly with respect to the urethane rubber members 38a, 38b, 38c. Then, the presser rollers 42a, 42b are displaced in the direction indicated by the arrow $Y_1$ in FIG. 2 by the ball screw, whereupon the light-shield film 6 is cut off at least by the cutter blade 34b. At this time, the light-shield film 6 is free of sagging as it is held under tension by the holder frame 40a.

The cut edge of the light-shield film 6 is complementary in shape to the upper tip end of the cutter blade 34b. Therefore, the cut edge of the light-shield film 6 has a wing 9b projecting laterally therefrom.

The light-shield film 6 is thus cut only by the cutter blade 34b when the light-shield film 6 is cut for the first time, i.e., when the leading end of the light-shield film 6 supplied from the light-shield film roll is cut. Subsequently, the light-shield film 6 will be cut by both the cutter blades 34a, 34b.

The leading end (debris) cut off from the light-shield film 6 supplied from the light-shield film roll is attracted by the suction box 32a. The suction box 32a is lowered together with the cutter blades 34a, 34b, and then elevated alone (see FIG. 5). The debris on the suction box 32a is then gripped by the chuck mechanism 43 and discharged. Thereafter, the suction box 32a and the cutter blades 34a, 34b return to their home position.

After the above cutting process (first cutting process), the presser rollers 42a, 42b are lifted and then displaced in the direction indicated by the arrow $Y_2$ in FIG. 2 for return to their home position. Then, the holder frame 40a is elevated to and, waits in, a position out of the way of the light-shield film 6.

The light-shield film 6 with the wing 9b formed on its distal end is fed again in the direction indicated by the arrow $X_1$ in FIG. 2 when the suction drum 26 and the first suction belts 28a through 28e are actuated. The leading end of the light-shield film 6 reaches a position somewhere in the feeding and positioning mechanism 16. The distance that the light-shield film 6 is fed is exactly the same as the width of the photosensitive film 5 because a control signal sent from the rotational speed controller 29 to the servomotor 27 controls the distance that the light-shield film 6 is fed to be equalized to the width of the photosensitive film 5. The feeding of the light-shield film 6 is stopped when the distance from the leading edge of the light-shield film 6 to a position directly above the cutter blade 34a (this distance excludes the widths of the wings 9a, 9b) agrees with the width of the photosensitive film 5.

Then, the suction feed system 30 and the second suction belts 50a–50e of the feeding and positioning mechanism 16 stop their operation. However, the light-shield film 6 still remains attracted to the second suction belts 50a–50e, the suction box 32a, the first suction belts 28a–28e, and the suction drum 26.

The holder frame 40a and the presser rollers 42a, 42b which have been in the home position are operated again. Specifically, when the light-shield film 6 is stopped, the holder frame 40a is lowered again to press the light-shield film 6 in a pattern according to the shape of the holder frame 40a. The presser rollers 42a, 42b are also lowered again to press the light-shield film 6 between themselves and the urethane rubber members 38a, 38b, 38c. The presser rollers 42a, 42b are thereafter displaced in the direction indicated by the arrow $Y_1$, whereupon the cutter blades 34a, 34b cut off a leading end portion of the light-shield film 6 as a light-shield film 6a whose length matches the width of the photosensitive film 5. The light-shield film 6a now has the wing 9b on its one side which has been formed by the cutter blade 34b in the preceding cutting cycle and the wing 9a on its opposite side which has been formed by the cutter blade 34a in the present cutting cycle. The leading end of the light-shield film 6, from which the light-shield film 6a has just been cut off, has another wing 9b thereon, which will be on a next light-shield film 6a to be cut off from the light-shield film 6. Consequently, at the same time that the light-shield film 6a whose length matches the width of the photosensitive film 5 is produced, a new wing 9b is formed with high dimensional accuracy on the leading end of the light-shield film 6.

As described above, the length to which the light-shield film 6a is cut is automatically adjusted into agreement with the width of the photosensitive film 5.

A portion of the light-shield film 6 which lies between the cutter blades 34a, 34b is treated as debris, which will be attracted to the suction box 32a and gripped and discharged by the chuck mechanism 43.

The first cutting mechanism 140 shown in FIG. 7 operates in the same manner as the first cutting mechanism 14.

The light-shield film 6a thus produced is fed in the direction indicated by the arrow $X_1$ in FIG. 2 by the second suction belts 50a–50e of the feeding and positioning mechanism 16, for a distance equal to the width of the photosensitive film 5 (this distance excludes the widths of the wings 9a, 9b).

When the light-shield film 6a is fed by the second suction belts 50a–50e, switching between positive and negative pressures in the chambers 52a through 52e may be controlled by the solenoid-controlled directional control valves (not shown) based on the length of the light-shield film 6a. Specifically, while the light-shield film 6a is being fed, a control unit (not shown) may calculate the length thereof, and control the solenoid-controlled directional control valves to develop a negative pressure in the chambers 52a through 52e. When the feeding of the light-shield film 6a is finished, the control unit may control the solenoid-controlled directional control valves to develop a positive pressure in the chambers 52a through 52e.

Since the feeding and positioning mechanism 16 employs a suction mechanism as with the light-shield film supply mechanism 12 as described above, the light-shield film 6a is prevented from being wrinkled, sagging, being warped, or otherwise positionally displaced when the light-shield film 6a is transferred from the light-shield film supply mechanism 12, cut from the light-shield film 6, and joined to the photosensitive film 5.

The light-shield film 6a is positioned in transverse alignment with the photosensitive film 5 by the feeding and positioning mechanism 16. At this time, the light-shield film 6a can be positioned with a very high positional accuracy of ±0.2 mm which also takes into account a positional error caused when it is cut off by the first cutting mechanism 14.

Thereafter, the light-shield film 6a is fed to an overlapping position. For example, the light-shield film 6a is positioned directly above the first suction box 60 and the third suction box 64. Then, the leading longitudinal end of the photosensitive film 5 is unwound from the spool 4 in the applying apparatus 10, and placed to overlap a transverse end of the light-shield film 6a as shown in FIG. 9. Then, an evacuating mechanism (not shown) connected to the suction boxes 60, 62, 64 is actuated to hold the light-shield film 6a and the photosensitive film 5, including their overlapping ends, in intimate contact with the suction boxes 60, 62, 64.

The rotary blade mechanism 68 is now displaced in the direction indicated by the arrow $X_1$ in FIG. 9 by the ball screw mechanism (not shown). The rotary blade 78, whose distance from the lower blade 66 has been adjusted to an adequate value by the side pressure adjusting mechanism, is rotated by the motor 86 through the transmission mechanism 87, the horizontal shaft 85, the gear 76 mounted on the horizontal shaft 85, and the gear 77 meshing with the gear 76, while at the same time the rotary blade 78 is moved as it is guided by being pressed by the first and second guide rollers 75a, 75b, as shown in FIG. 11. During this time, the rotary blade 78 is pressed downwardly together with the first arm 74a and the second arm 74b by the cylinder 70, and axially displaced to a position directly above the lower blade 66 by the cylinder 79. The downward movement of the rotary blade 78 causes the rotary blade 78 to coact with the lower blade 66 to sever the overlapping ends of the light-shield film 6a and the photosensitive film 5. At this time, since the first and second guide rollers 75a, 75b press and tension the light-shield film 6a and the photosensitive film 5, the light-shield film 6a and the photosensitive film 5 are prevented from flexing and being displaced from each other. As shown in FIGS. 12 and 13, the leading end of the light-shield film 6a and the end of the photosensitive film 5 which are cut off become overlapping debris 5b, 6b. The debris 5b cut off the photosensitive film 5, which is positioned on the light-shield film 6a, should preferably be removed by hand.

A new longitudinal end of the photosensitive film 5 and a new transverse end of the light-shield film 6a, which are formed in the above cutting process (second cutting process), are now held in abutment against each other. After the second cutting process, the cylinder 79 is actuated to displace the rotary blade 78 laterally against the bias of the helical spring, and the cylinder 70 is actuated to lift the rotary blade 78, for thereby returning the rotary 78 to its home position. The rotary blade mechanism 68 is then retracted in the direction indicated by the arrow $X_2$.

In timed relation to the retracting movement of the rotary blade mechanism 68, the taping mechanism 100, which is actuated by the actuator of the rotary blade mechanism 68, is advanced, i.e., displaced along the guide rail 104 in the direction indicated by the arrow $X_2$. At this time, as shown in FIG. 14, the joining tape 106 is unreeled from the joining tape roll 108, travels around the auxiliary rollers 112a, 112b, is pressed by the cylinder 116, and then separated into a joining tape sheet 106a and a peel-off sheet 106b at a position downstream of the cylinder 116. The peel-off sheet 106b runs around the auxiliary roller 112e and is wound around the peel-off sheet takeup roller 110.

The joining tape sheet 106a travels around the auxiliary rollers 112c, 112d and then reaches the presser roller 118. The presser roller 118 is angularly moved about the shaft 120 to press the joining tape sheet 106a against the abutting ends of the photosensitive film 5 and the light-shield film 6a. Upon the advancing displacement along the guide rail 104a of the taping mechanism 100, the presser rollers 124a, 124b press the joining tape sheet 106a to apply the joining tape sheet 106a to the abutting ends of the photosensitive film 5 and the light-shield film 6a, thus joining the photosensitive film 5 and the light-shield film 6a to each other. After the photosensitive film 5 and the light-shield film 6a are joined to each other, the tape cutter 126 is actuated to cut off the joining tape sheet 106a at an appropriate position thereon.

The photosensitive film 5 and the light-shield film 6a which are thus joined to each other are finally wound on the spool 4 on the applying apparatus 10.

During a period of time after the photosensitive film 5 and the light-shield film 6a have been cut off by the second cutting mechanism 18 and before the taping mechanism 100 is advanced, the debris 6b cut off the light-shield film 6a is discharged by debris discharging mechanism. Specifically, the third suction box 64 which is attracting the debris 6b is lowered by the linear actuator (not shown). Then, the chuck mechanisms 90a, 90b are advanced, i.e., displaced in the direction indicated by the arrow $Y_2$ in FIG. 12, and grip a side edge of the debris 6b attracted to the third suction box 64. Thereafter, the chuck mechanisms 90a, 90b are retracted in the direction indicated by the arrow $Y_1$. While the chuck mechanisms 90a, 90b are being retracted, the debris 6b gripped thereby is hit by the vertical rods 94a, 94b, and falls off the chuck mechanisms 90a, 90b along the guide plate 96 into the stock tray 98. When the chuck mechanisms 90a, 90b are retracted in the direction indicated by the arrow $Y_1$, and the debris 6b gripped by the chuck mechanisms 90a, 90b is detected by the light detectors 92a, 92b, the third suction box 64 is lifted back to its home position by the linear actuator.

After the debris 6b has been removed, the suction feed system 30 is actuated again to feed the light-shield film 6 from its standby state to the second cutting mechanism 18, and a photosensitive film 5 is set in place again in readiness for being joined to a light-shield film 6a.

The above cycle of operation is thereafter repeated.

As described above, even when the photosensitive film 5 is changed to a new photosensitive film 5 having a different width, the length to which the light-shield film 6 will be cut is automatically adjusted so as to match the width of the new photosensitive film 5. Consequently, it is not necessary to prepare a plurality of light-shield films so as to match different widths of photosensitive films that may possibly be employed. As a result, the existing light-shield film does not need to be changed.

The light-shield film and the photosensitive film can easily be joined to each other. The applying apparatus according to the present invention, therefore, can achieve high productivity and labor-saving capability.

Although certain preferred embodiments of the present invention have been shown and described in detail, it should be understood that various changes and modifications may be made therein without departing from the scope of the appended claims.

What is claimed is:

1. A method of applying a light-shield member to an outer circumferential surface of a rolled photosensitive member, comprising the steps of:

(a) feeding an elongate light-shield member in a direction transverse to a longitudinal direction of a rolled photosensitive member;

(b) cutting off a leading end portion of said elongate light-shield member into a light-shield member having a predetermined shape corresponding to the width of said rolled photosensitive member;

(c) feeding said light-shield member to an overlapping position and causing a transverse end of said light-shield member to overlap a longitudinal end of said rolled photosensitive member;

(d) joining said light-shield member endwise to said rolled photosensitive member; and (e) winding said light-shield member around said rolled photosensitive member thereby to apply said light-shield member to an outer circumferential surface of said rolled photosensitive member.

2. A method according to claim 1, wherein said step (b) comprises the step of simultaneously cutting a trailing end of said light-shield member and a leading end of said elongate light-shield member.

3. A method according to claim 2, wherein said step (b) comprises the step of varying the length of said light-shield member.

4. A method according to claim 1, wherein said step (a) comprises the step of attracting said elongate light-shield member while feeding said elongate light-shield member.

5. A method according to claim 1, wherein said step (c) comprises the step of feeding said light-shield member for a length corresponding to the width of said rolled photosensitive member while attracting said light-shield member.

6. A method according to claim 1, wherein said step (b) comprises the step of pressing said elongate light-shield member near a region thereof to be cut for thereby keeping said elongate light-shield member under tension while cutting said leading end portion of the elongate light-shield member into said light-shield member.

7. A method according to claim 1, further comprising the step of:

(f) after said step (c), cutting off the overlapping ends of said light-shield member and said rolled photosensitive member.

8. A method according to claim 7, further comprising the step of:

(g) automatically discharging debris produced in said step (f).

* * * * *